Patented Jan. 17, 1933

1,894,377

UNITED STATES PATENT OFFICE

SAMUEL S. LERNER, OF CHICAGO, ILLINOIS

METHOD OF PREPARING A FOOD PRODUCT

No Drawing.   Application filed February 17, 1930.   Serial No. 429,218.

The object of this invention is the production of a food having tonic and health giving qualities. Its use will be beneficial to those enjoying good health and likewise to those not so fortunate who may be in a state of poor health and who consequently are in need of an easily digested, invigorating food that will build up the system by enriching the blood. None of the ingredients used are of a harmful character and when mixed and prepared in the manner set forth are readily assimilated or taken into the system without fatigue of the digestive or assimilative organs and with resultant benefit to the individual.

In making the composition, I use baking soda, kefir fungi, sweet milk from the cow, skimmed sweet milk, cream, butter, and water. The kefir fungi serves as a culture source for producing a base and starter for the ultimate product.

In preparing the composition I use the ingredients in about the following proportions, viz. water 1 glass; skimmed milk, 10 gallons; sweet milk, one quart; cream, two quarts; butter, eight pounds; kefir fungi, 25 grams; baking soda, one teaspoonful.

In preparing the drink a base or "starter" is first formed. This is done by taking about one pint of water that has been brought to the boiling point to sterilize it and then cooled to blood heat, add thereto and dissolve the one teaspoonful of baking soda. To this add the 25 grams of kefir fungi. Stir this mixture for a few moments with a spoon to wash and soften the kefir fungi. Pour out this wash liquid and throw it away leaving the washed kefir fungi. In the same container add one pint of pure water that has been brought to the boiling point and then cooled to blood heat. Stir for a few moments and then throw away the liquid. Repeat this about four times. This is to rinse the kefir fungi thoroughly and soften the same so as to more readily ferment the milk.

Now in order to more thoroughly soften the kefir fungi pour 1 pint of boiled water, that has been cooled to blood heat, and this time let the water stand in the container with the kefir fungi for the period of eight hours and then throw the water which has become yellow away. Repeat this about nine times. Now place the kefir fungi in a cheese cloth sack of a size about 4 x 4 inches. Sew up the mouth of the sack.

Now take one quart of sweet milk from the cow. Put it in a receptacle, for instance, a white enameled jar and place this in a culture cabinet where the milk is to attain a temperature of 190° Fahrenheit. While this temperature is being acquired, stir the milk every ten minutes. The milk is to remain at this temperature for one hour after which it is gradually cooled, still in the cabinet, to 78 degrees Fahrenheit.

Now place the kefir fungi, still in its bag, in the jar of milk, still in the culture cabinet and let the mixture remain for ten hours at the temperatures of about 78 degrees Fahrenheit. Now pour off the water in the cabinet about the jar and substitute ice therefor which is to remain until the contents of the jar become quite cold. A period of about two hours usually being required. The culture base or starter has now been formed.

Now take ten gallons of skimmed milk and place it in a pasteurizer and raise its temperature to 160 degrees Fahrenheit. Add thereto two quarts of cream and eight pounds of butter, or enough butter to give the skimmed milk a butter fat content of eight to ten per cent. This mixture is now to be kept at the temperature of 160 degrees Fahrenheit for thirty minutes to kill all germs. The mixture is now taken out of the pasteurizer and while hot put through a viscalizer where the ingredients are thoroughly mixed and commingled and squirted in small streams into cans.

The mixture as it comes from the viscalizer is collected in cans convenient for handling. Then when it is all collected, it is again placed in the pasteurizer and further mixed and cooled to a temperature of 98 degrees Fahrenheit. To this mixture add the base. For each ten gallons of this mixture one quart of the base is used. The mixture is now again put through the viscalizer and mixed thoroughly. This final mixture is placed in ten gallon cans, covered, and placed in a covered container of hot water of about 140° F. temperature until a temperature of 100 degrees Fahrenheit is attained. The cans are kept in this water for ten hours to thicken the product. The hot water which has cooled somewhat is now drawn off and ice substituted therefor which remains in the container for several hours to chill the product. The mixture is now bottled and capped, like bottles of cream, ready to be served.

What is claimed is:—

1. The process of making a food product which consists in mixing together skimmed milk, butter and cream, and establishing and maintaining the temperature thereof sufficiently to kill all germs, then cooling the mixture to a degree favorable for culture growth, then adding and mixing therein a kefir fungi culture base or starter and maintaining a ferment temperature for about ten hours.

2. The process of making a food product which consists in mixing together and heat sterilizing, skimmed milk, sweet milk, butter and cream in the proportions of about five gallons of skimmed milk, one-eighth gallon of sweet milk, one quarter gallon of cream, four pounds of butter, cooling the same to a culture growing temperature, then mixing therewith a kefir fungi treated milk culture, and then maintaining a culture growing temperature of about 100° F. for about ten hours.

3. The method of compounding a food product consisting in immersing twenty-five grams of kefir fungi in one pint of warm sterilized water having one teaspoonful of baking soda therein and, after discarding the water repeatedly, rinsing the kefir fungi in warm sterilized water and discarding the water after each rinsing, in order to cleanse and soften the kefir fungi, confining the cleaned kefir fungi in a porous container such for instance as cheese cloth or the like, and then steeping the same in one quart of sterilized (about 190° F.) sweet milk (which has been cooled) for approximately ten hours at about 78° F. to form a base, and then chilling the same, thus providing a starter; heating ten gallons of skimmed milk to 160° F. and adding two quarts of cream and eight pounds of butter, and after thoroughly mixing the same, reducing the temperature to 98° F.; and adding the said base in the proportion of one quart of base to ten gallons of the mixture, raising gradually the temperature of the resulting mixture to about 100° F. and then gradually cooling to 98° F. and then, after ten hours, chilling the same and bottling for the market.

In testimony that I claim the foregoing as my own I have hereto affixed my signature.

SAMUEL S. LERNER.